United States Patent
Srinivasan et al.

(10) Patent No.: US 10,937,461 B2
(45) Date of Patent: Mar. 2, 2021

(54) INCORPORATING VISUAL OBJECTS INTO VIDEO MATERIAL

(71) Applicant: Mirriad Advertising PLC, London (GB)

(72) Inventors: Ram Srinivasan, London (GB); Tim Harris, London (GB); Philip McLauchlan, London (GB)

(73) Assignee: MIRRIAD ADVERTISING PLC, London (GB)

(*) Notice: Subject to any disclaimer, the term of this patent is extended or adjusted under 35 U.S.C. 154(b) by 0 days.

(21) Appl. No.: 16/881,224

(22) Filed: May 22, 2020

(65) Prior Publication Data
US 2020/0372937 A1    Nov. 26, 2020

(30) Foreign Application Priority Data
May 24, 2019 (EP) .................................. 19176530

(51) Int. Cl.
| H04N 5/93 | (2006.01) |
| G11B 27/036 | (2006.01) |
| H04N 21/234 | (2011.01) |
| H04N 21/845 | (2011.01) |

(52) U.S. Cl.
CPC ..... G11B 27/036 (2013.01); H04N 21/23418 (2013.01); H04N 21/8456 (2013.01)

(58) Field of Classification Search
CPC .............. G11B 27/036; H04N 21/8456; H04N 21/23418
USPC .......................... 386/278, 281, 326, 248, 249
See application file for complete search history.

(56) References Cited

U.S. PATENT DOCUMENTS

| 9,438,936 B1* | 9/2016 | Srinivasan .......... H04N 21/6379 |
| 2013/0091519 A1 | 4/2013 | McLauchlan |
| 2014/0150013 A1 | 5/2014 | Fauqueur |
| 2014/0359656 A1* | 12/2014 | Banica ................. H04N 21/234 725/32 |
| 2018/0315455 A1 | 11/2018 | Fauqueur |

FOREIGN PATENT DOCUMENTS

EP    3 076 681    10/2016

OTHER PUBLICATIONS

European Patent Office, Extended European Search Report for European Patent Application No. EP 19176530.4, dated Sep. 19, 2019.

* cited by examiner

*Primary Examiner* — Robert Chevalier
(74) *Attorney, Agent, or Firm* — SoCal IP Law Group LLP; Jonathan Pearce

(57) ABSTRACT

This disclosure relates to the embedding of visual objects into the image content of a video by a visual embed specialist, whilst maintaining the security of the video. A low-resolution version of the video content is sent by the video owner to the specialist for analysis to identify parts of the video that are suitable for visual object insertion. A high resolution version of those identified parts of the video is then sent to the specialist for visual object insertion. The specialist may then return the modified parts of the video and the content owner create a final version of the high-resolution video by replacing the relevant parts of the high-resolution video with the modified parts.

20 Claims, 7 Drawing Sheets

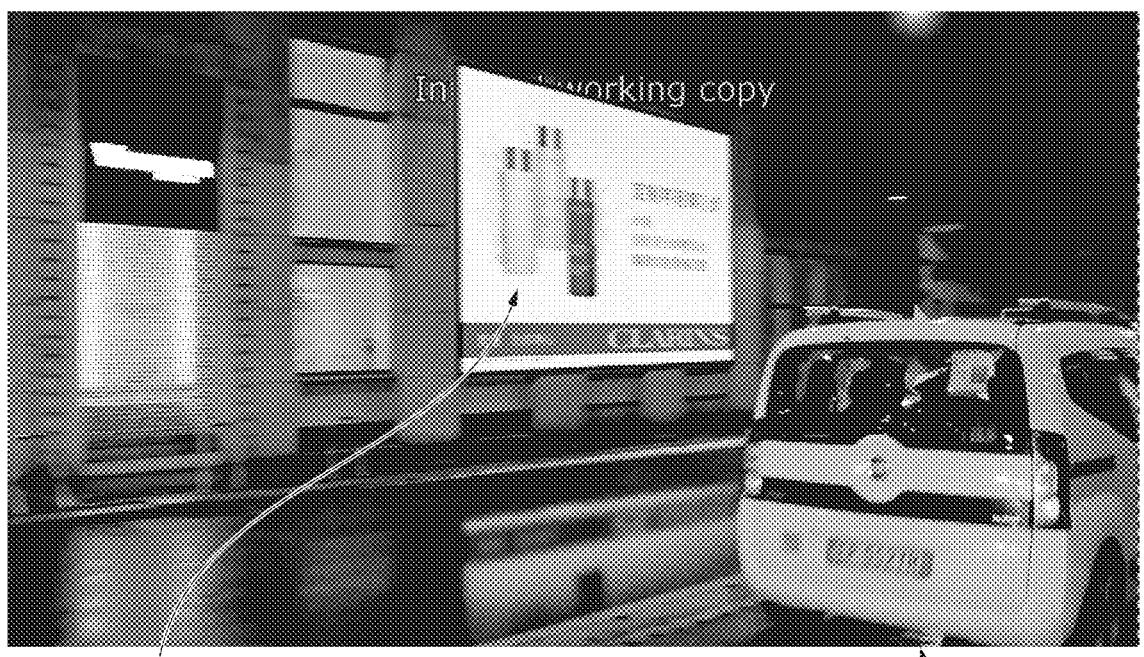
FIG. 7

INCORPORATING VISUAL OBJECTS INTO VIDEO MATERIAL

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority to a counterpart European Patent Application number EP19176530.4 with the same title, filed May 24, 2019.

TECHNICAL FIELD

The present disclosure relates to a computer implemented method, system, apparatus and non-transitory computer-readable medium for incorporating one or more visual objects into source video material.

BACKGROUND

With the advent of digital file processing, it is possible to digitally insert objects (also referred to herein as "embed") into the image content of a video. Digitally inserting objects in a video may have many benefits, for example enhancing the visual effects of the video, or improving the realism of a video, or allowing more flexibility for the video after it is shot, meaning that fewer decisions need to be made regarding objects to include in a scene at the stage of filming the scene. Consequently, digital object insertion is becoming increasingly common and utilised by video makers for all manner of purposes.

Digital object insertion is often carried out by specialists who are not the owners of the video itself. For many video owners, it may be important to control tightly the distribution of new videos, to minimise piracy risks and minimise the chances of videos being made available unofficially ('leaked') before any official release date. Therefore, maintaining robust video content security may be an important consideration for video owners when working with external digital object insertion specialists.

SUMMARY

This disclosure relates to the embedding of visual objects into the image content of a video by a visual embed specialist, whilst maintaining the security of the video. A low-resolution version of the video content is sent by the video owner to the specialist for analysis to identify parts of the video that are suitable for visual object insertion. A high resolution version of those identified parts of the video is then sent to the specialist for visual object insertion. The specialist may then return the modified parts of the video and the content owner create a final version of the high-resolution video by replacing the relevant parts of the high-resolution video with the modified parts.

In a first aspect of the present disclosure, there is provided a computer implemented method of incorporating one or more visual objects into source video material, wherein the source video material comprises a plurality of frames, the method comprising: obtaining low-resolution source video data comprising a first plurality of frames of video material, wherein the first plurality of frames are a low-resolution version of the frames of the source video material; analysing the low-resolution source video data to identify selected frames of the source video material that include one or more insertion zones, wherein the insertion zones correspond to one or more regions within the image contents of the selected frames of the source video material that are suitable for the insertion of one or more visual objects; obtaining high-resolution source video data comprising a second plurality of frames of the video material, wherein the second plurality of frames comprise a high resolution version of the selected frames of the source video material; embedding the one or more visual objects into the high resolution version of the selected frames of the source video material; and creating output video data that comprises the high resolution version of the selected frames of the source video material with the embedded one or more visual objects, wherein the second plurality of frames comprises a high-resolution version of some, but not all, of the frames of the source video material.

The image resolution of the second plurality of frames may be a broadcast image resolution.

The image resolution of first plurality of frames may be a sub-broadcast image resolution.

The second plurality of frames may consist of only the high-resolution version of the selected frames of the source video material.

The source video material may be divided into one or more segments when transmitted by a distributor, and wherein a start of the second plurality of frames corresponds with a start of a segment into which the source video material is to be divided when transmitted by the distributor.

The computer implemented method may further comprise transmitting the output video data to a distributor and/or content owner.

The computer implemented method may further comprise the distributor and/or content owner creating a final video by replacing the relevant frames of a high-resolution version of the source video with the output video data.

The low-resolution source video data may comprise a visible or invisible watermark. Additionally or alternatively, the high-resolution source video data may comprise an invisible watermark.

In a second aspect of the present disclosure, there is provided a non-transitory computer-readable medium comprising computer executable instructions stored thereon, which when executed by a computing device cause the computing device to perform the method according to the first aspect of the present disclosure.

In a third aspect of the present disclosure, there is provided an electronic device configured to perform the method according to the first aspect of the present disclosure.

In a fourth aspect of the present disclosure, there is provided a system for incorporating one or more visual objects into source video material, wherein the source video material comprises a plurality of frames, the system comprising: memory configured to store low-resolution source video data comprising a first plurality of frames of video material, wherein the first plurality of frames are a low-resolution version of the frames of the source video material; and one or more processors configured to: analyse the low-resolution source video data to identify selected frames of the source video material that include one or more insertion zones, wherein the insertion zones correspond to one or more regions within the image contents of the selected frames of the source video material that are suitable for the insertion of one or more visual objects; obtain high-resolution source video data comprising a second plurality of frames of the video material, wherein the second plurality of frames comprise a high resolution version of the selected frames of the source video material; embed the one or more visual objects into the high resolution version of the selected frames of the source video material; and create output video data that comprises the high resolution version of the selected frames of the source video material with the embedded one or more visual objects, wherein the second plurality of frames comprises a high-resolution version of some, but not all, of the frames of the source video material.

The image resolution of the second plurality of frames may be a broadcast image resolution.

The image resolution of first plurality of frames may be a sub-broadcast image resolution.

The second plurality of frames may consist of only the high-resolution version of the selected frames of the source video material.

The source video material may be divided into one or more segments when transmitted by a distributor, and wherein a start of the second plurality of frames corresponds with a start of a segment into which the source video material is to be divided when transmitted by the distributor.

The system may be further configured to transmit the output video data to a distributor.

In a fifth aspect of the present disclosure, there is provided a system for storing source video material, the system comprising: memory configured to: store a low-resolution version of the source video material, wherein the low-resolution version of the source video material has a first image resolution; and store a high-resolution version of the source video material, wherein the high-resolution version of the source video material has a second image resolution that is higher than the first image resolution; and one or more processors configured to: communicate low-resolution source video data to a visual object insertion module, the low-resolution source video data comprising the low-resolution version of the source video material; receive a request for a high-resolution version of some, but not all, frames of the source video material; and communicate high-resolution source video data comprising the requested frames of the high-resolution version of the source video material.

DRAWINGS

Aspects of the present disclosure are described, by way of example only, with reference to the following drawings, in which:

FIG. 7 shows an example visualisation of an embedded visual object.

DETAILED DESCRIPTION

There are many different reasons why it may be desirable to insert visual objects into video content in such a way that the visual objects appear to be part of the visual images of the video content. For example, it may enhance the visual effects of the video, or improving the realism of a video, or allowing more flexibility for the video after it is shot meaning that fewer decisions need to be made during the filming of scenes.

Often, video content owners do not have the capabilities to analyse the video content to identify object insertion opportunities, or to carry out the visual object insertion in an effective manner. Therefore, external video embed specialists are often used. However, the data size of modern video content can be very large (particularly for features films), so making the video content available to an external video embed entity can represent a significant data overhead. Furthermore, whenever video content is made available to external entities, it represents a security risk, for example presenting a piracy risk or increasing the possibility of an early, unofficial release.

In the present disclosure, initially a low-resolution version of the video content is sent to the video embed entity for analysis to identify parts of the video that are suitable for visual object insertion. A high resolution version of those identified parts of the video is then sent to the video embed entity, who can then insert the visual object(s) and return the modified parts of the high-resolution video. A final version of the high-resolution video can then be created by the content owner or distributor by replacing the relevant parts of the high-resolution video with the modified parts. In this way, the visual embed entity is able to analyse the video content and identify insertion opportunities, and a high-resolution version of the video can be created that includes a visual object(s) inserted by the visual embed entity, without the data overheads and content security risks associated with transmitting the entire high-resolution video.

Figure 1:
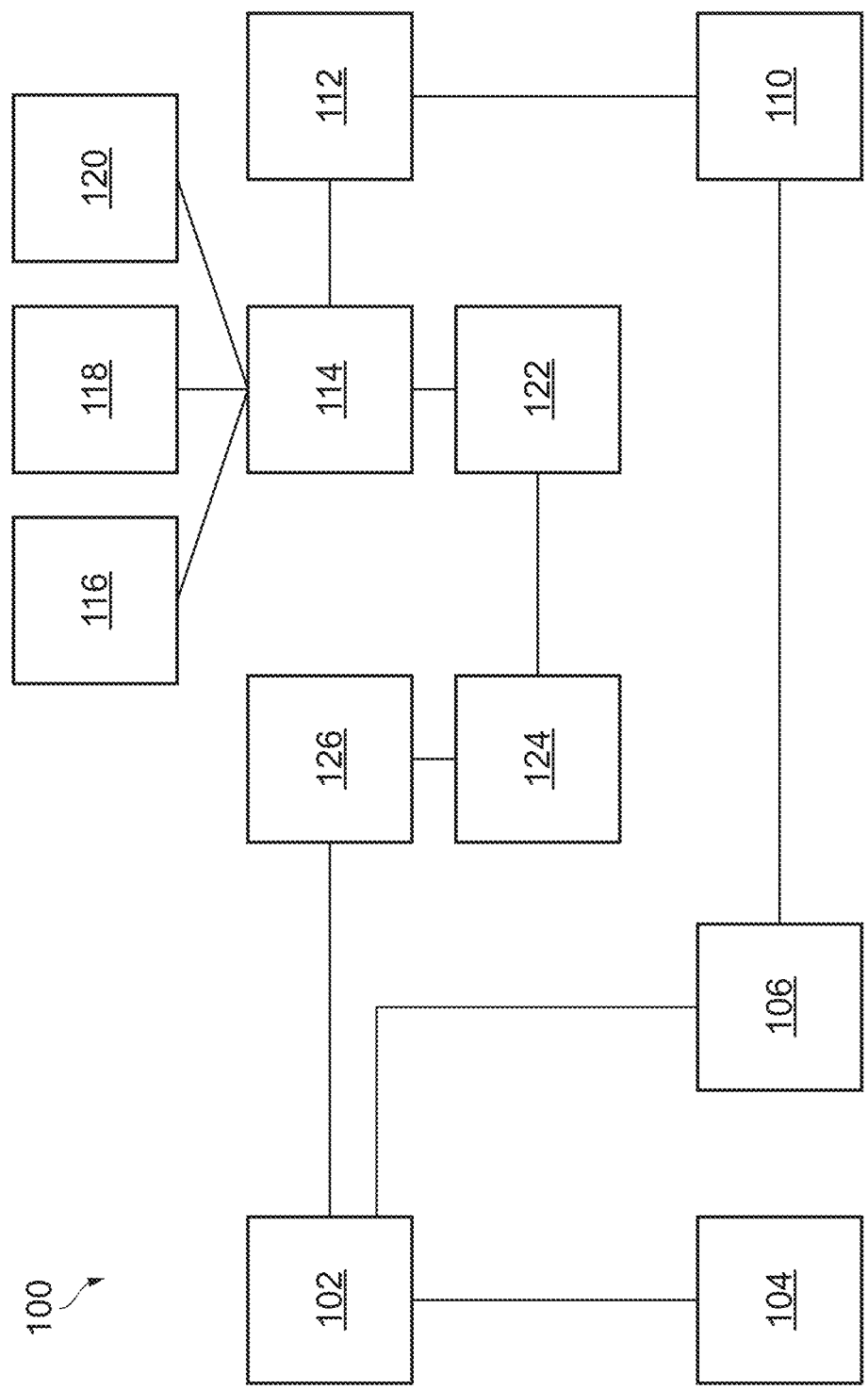
FIG. 1 illustrates a schematic diagram showing a system in accordance with some aspects of the disclosure.

FIG. 1 is a schematic diagram showing a video processing system 100 in accordance with some aspects of the present disclosure. The subsystems of the video processing system 100 are connected via one or more data communication networks (not shown). In some implements, the subsystems may be connected to each other via the Internet.

Subsystem 102, which is referred to herein as the "source" hub, performs amongst other things, video data analysis in the video processing system 100. The source hub 102 may retrieve or obtain source video data as one or more digital files, supplied, for example, on video or data tape, on digital versatile disc (DVD), over a high-speed computer network, via the network, on one or more removable disc drives or in other ways. In some implementations, the source video data may be provided by a distributor. In other implementations, the source video data may be provided by a content owner 104.

The source video data comprises frames of video material. Contiguous frames of video material set in one location are known as shots.

In some implementations, the source hub 102 comprises a video data analysis module, which performs pre-analysis in relation to source video data. Such analysis may be performed using appropriate software which allows visual objects to be embedded digitally into the image content of existing video material.

The pre-analysis may be fully automated in that it does not involve any human intervention.

In some implementations, the video data analysis module is used to perform a pre-analysis pass in relation to the source video data to identify one or more shots in the source video material. This may involve using shot detection and/or continuity detection which will now be described in more detail.

Pre-analysis may comprise using a shot detection function to identify the boundaries between different shots in video material. For example, the video data analysis module may automatically detect "hard" and "soft" cuts between different shots, which correspond to hard and soft transitions respectively. Hard cuts correspond to an abrupt change in visual similarity between two consecutive frames in the video material. Soft cuts correspond to the beginning or the end of a soft transition (for example wipe and cross fading transitions), which is characterised by a significant but gradual change in visual appearance across several frames.

Pre-analysis may comprise using a continuity detection function to identify similar shots (once detected) in video material. This can be used to maximise the likelihood that each (similar) shot in a given scene is identified—this may be a benefit for continuity of object insertion throughout the video material. For each detected shot, a shot similarity algorithm automatically detects visually similar shots within the source video material. The similarity detection is based on matching between frames, which captures an overall global similarity of background and lighting. It may be used to identify shots which are part of a given scene in order to speed up the process of selecting shots that should be grouped together on the basis that they are similar to each other.

Pre-analysis may comprise using an object and/or locale template recognition function and/or a face detection and recognition function. Object template recognition involves identifying objects which reappear across, for example, multiple episodes of a television program, and which are appropriate for visual object insertion, so that they can automatically be found in other episodes of the program. Locale template recognition allows a template to be built for a certain locale in a television program and automatically detect the appearance of the locale in subsequent episodes of the program. A locale is a location (e.g. a room) which appears regularly in the program across multiple episodes. Face detection and recognition involve identifying characters which, for example, reappear across multiple episodes of a television programme.

Pre-analysis may comprise using a tracking (such as 2D point tracking) function to detect and track multiple point features in video data. This involves using a tracking algorithm to detect and track feature points between consecutive frames. Feature points correspond to locations within an image which are characteristic in visual appearance; in other words they exhibit a strong contrast (such as a dark corner on a bright background). A feature is tracked by finding its location in the next frame by comparing the similarity of its neighbouring pixels.

Pre-analysis may comprise using a planar tracking function to follow image regions over time and determine their motion under the assumption that the surface is a plane. This may involve tracking 2D regions defined by splines, calculating their 2D translation, rotation, scale, shear and foreshortening through the video material. This process creates motion information that can be exploited by other video analysis functions.

Pre-analysis may comprise using a motion-from-features detection function which involves using the tracked 2D points to determine 2D motion in the video material. Given a set of tracked feature points, motion-from-features detection involves detecting which points move together according to the same rigid motion.

Pre-analysis may comprise using a 3D tracking function which involves using the tracked 2D points to determine 3D motion in the video material. 3D tracking involves extracting geometric information from a video shot, for example the camera focal distance, position and orientation as it moved. The other information recovered is the 3D shape of the viewed scene, represented as 3D points.

Pre-analysis may comprise using an autokeying function to separate background and foreground areas, allowing products to be digitally placed while respecting any occluding (foreground) objects to provide a natural-looking embedded image. When a foreground object moves in front of the background where it is desired to place a product digitally, the area into which the product is to be placed should stop at the boundary between the foreground and background areas. In general, the digitally placed product should cover the "mask" area of the background data. The correct mask can be especially difficult to create when the edge of the foreground object is very detailed or blurred. The autokey algorithm uses the planar tracker to create motion information so that known background or foreground areas can be propagated forwards and backwards through the video in time.

Pre-analysis may comprise region segmentation which is used to split the video data into regions that span both time and space. Region segmentation involves using an algorithm that detects regions of similar pixels within and across frames of a given video scene, for example to select point features for motion estimation.

Pre-analysis may comprise using a black border detection function, which is used to find the borders around the video image part of video material. This involves using an algorithm that detects the presence of black bars around the frames in a video sequence, which can interfere with various video processing algorithms.

The source hub analyses the source video data to find regions within the source video material which are suitable for insertion of one or more additional visual objects into the image content of the source video. The regions within the source video which are suitable for receiving additional visual objects are known as insertion zones.

In one implementation, the source hub 102, is also used for creative work in the video processing system 100.

The source hub 102 may be provided with the modules, such as a tracking module which may be used to determine how the position of a digitally inserted visual object should vary when added into video material, for example to take into account any movement of the camera that recorded the video material. Tracking may be automated and/or may involve human intervention.

The source hub 102 may also comprise a masking module. The masking module is used to assess how to handle occlusion (if any) of a visual object to be digitally inserted in video material having regard to other objects that may already be present in the video material. Masking assessment may be automated and/or may involve human intervention.

The source hub 102 may also comprise an appearance modelling module. The appearance modelling module is used to provide a desired appearance in relation to the digitally placed product, for example using blur, grain, highlight, 3D lighting and other effects. Appearance modelling may be automated and/or may involve human intervention.

Subsystem 106 in FIG. 1 represents a data store which is suitable for storing video data.

Subsystems 110 and 112 represent an origin server and content delivery network (CDN) respectively. CDN allow data to be transmitted more efficiently over the internet and are well known in the art.

Subsystem 114, which is referred to as the "distributor", performs amongst other things, video distribution. An example of a distributor is YOUTUBE®. The distributor allows access to video files to users through the network.

Subsystems 122, 124 and 126 represent a stream manager, object insertion decision system and object insertion policy manager respectively.

Traditional video streaming techniques such as Real-Time Streaming Protocol (RTP) and Windows Media HTTP Streaming Protocol (MS-WMSP) involved a server sending a steady stream of data packets, encoded at a uniform bitrate, to a client, such as 116, 118 or 120. The server sends the data packets to the client only at the bitrate at which the video is encoded. For example, if a source video is encoded at 500 kbps, then the video will be streamed at 500 kbps. Further, the server only sends enough data packets to fill the client buffer. The client buffer is typically between 1 and 10 seconds. This means that even if a user pauses a streaming video, only between 1 and 10 seconds of video material is downloaded at the client.

Progressive download advanced traditional streaming techniques by allowing streamed video to be played at the client before the whole video file has been downloaded. Progressive download is supported by most media players and platforms and operates based on a simple download from an HTTP Web Server. Unlike traditional streaming, if a video is paused, the remainder of the video will continue to download to the client.

Figure 2:
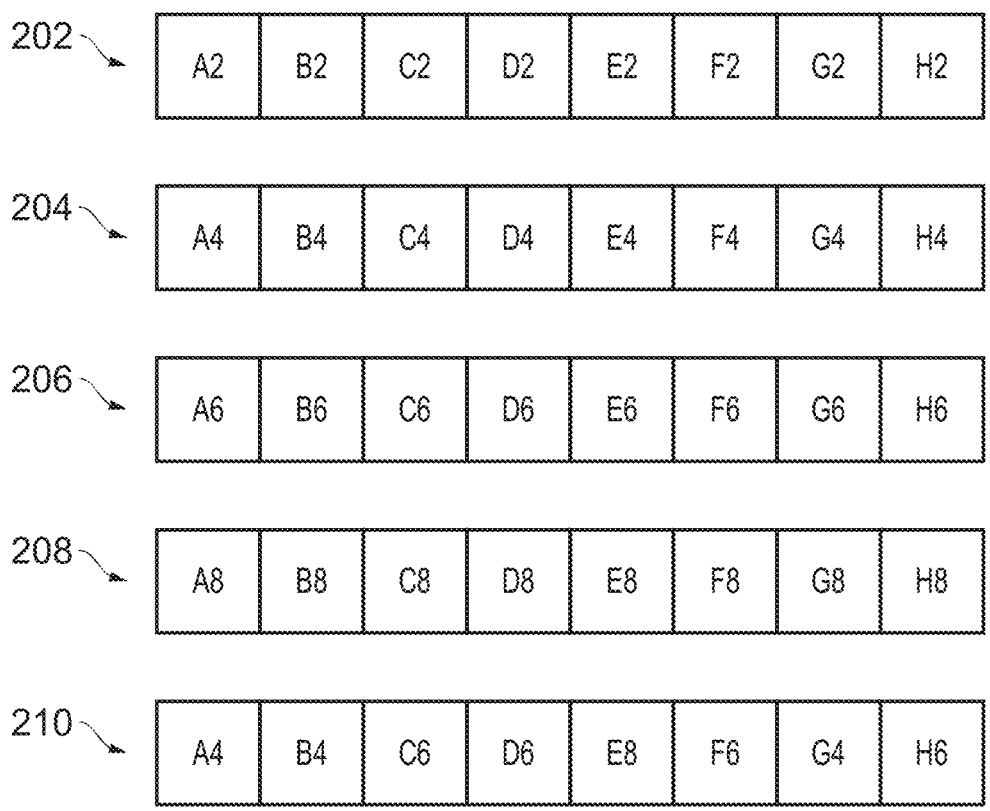
FIG. 2 illustrates an example of adaptive bitrate streaming.

FIG. 2 illustrates adaptive bitrate streaming. Adaptive bitrate streaming works by splitting video data 202 into many "chunks" or "segments", such as A2, B2, C2, etc. The segments are uniform and are typically between 2 s and 10 s long. The exception to the rule regarding uniform segments is that the last segment size may not correspond to the size of other segments. Alternatively, the segment size may be defined in terms of the number of frames of video material. For example, the segment size may be between 50 and 250 frames. The segment size is determined by a distributor, and varies depending on the distributors delivery platform and the type of content (live, VoD etc.). The distributor may provide data to the source hub 102 defining a segment size used by the distributor into which final video data is divided before transmission.

Each segment may be encoded into at least two bitrates by an encoder. In FIG. 2, the video data is encoded into three bitrates represented by 204, 206 and 208. In some examples, each segment may be encoded into between 3 and 14 different bitrates of different quality. In one example, each segment is encoded into three bitrates: 400 Kbps, 700 Kbps and 1500 Kbps.

The client can now choose between segments encoded at different bitrates depending on the available network capacity for the client. If the client has a high bandwidth capacity then the segments encoded at a high bitrate are selected and the video data is streamed at a higher quality. If the network bandwidth is reduced, then the client can select a lower bitrate segment. As with progressive download, the video data will continue to download if the user pauses a video. In the example of FIG. 2, the first two segments are selected from the encoded video data 204. The next segment is selected from the encoded video data 206, etc.

Each segment begins with an Instantaneous Decoder Refresh (IDR) frame. The IDR frame is utilized as a reference frame for the other video frames in the segment. As the remaining frames in the segment reference the IDR frame, compression techniques may be employed to compress the segment video data. Subsequent frames can be decoded using the IDR frame and do not need any other information prior to that. The remaining frames in a segment would not be played if the IDR frame is missing. In one embodiment, the segment size corresponds to the IDR frame interval.

Adaptive bitrate streaming may allow the client to download the video data at a rate suitable to the current network conditions and therefore it reduces the risk that there will not be sufficient video segments in the client buffer to continue playing the video.

Figure 3:
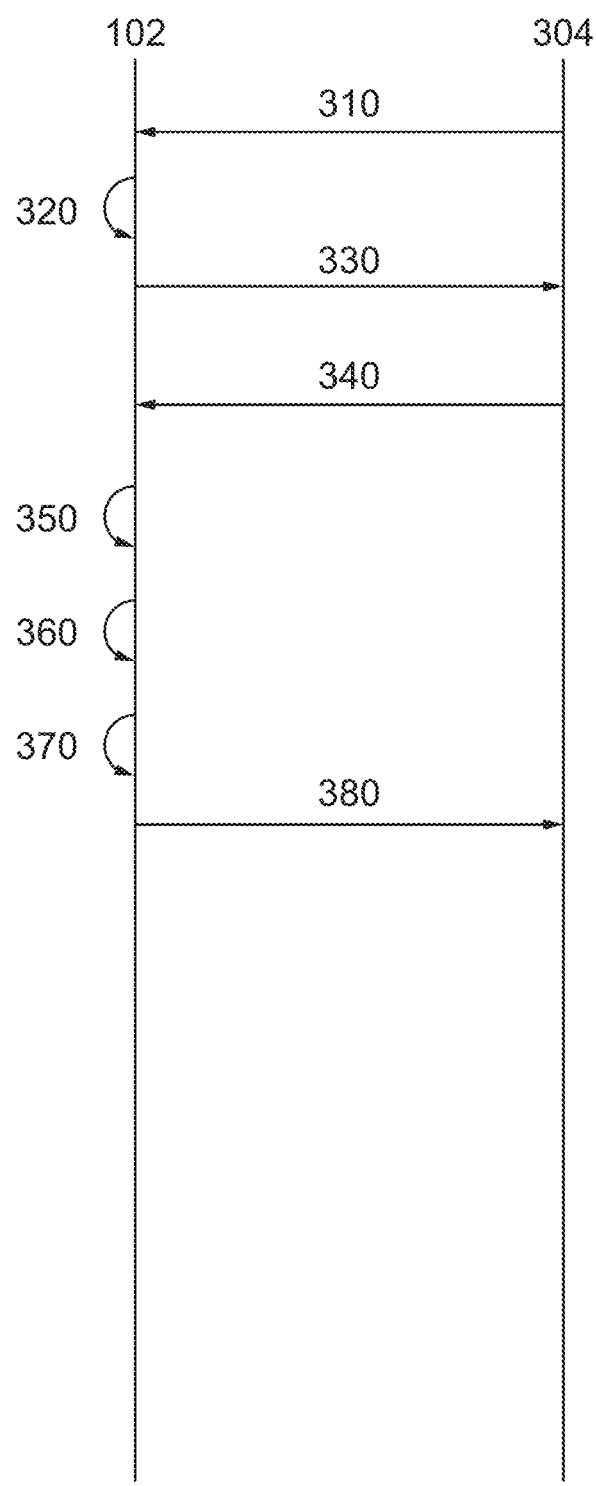
FIG. 3 shows a sequence timing diagram showing the flow of messages associated with adding one or more visual objects into video material in accordance with some aspects of the disclosure.

FIG. 3 shows a sequence timing diagram showing the flow of messages associated with adding one or more visual objects into video material in accordance with some aspects of the disclosure.

In step 310, the source hub 102 obtains source video data from a source video data holding entity 304 (for example, the distributor 114 or content producer). The source video data is low-resolution source video data and relates to all, or a significant proportion of, the source video material. In this way, the source hub 102 obtains a low-resolution version of the entire source video material, or a significant part of the source video material. The low-resolution source video data comprises a first plurality of frames that has a first (relatively low) image resolution.

The source video data holding entity 304 will typically also hold a high-resolution version of the video material, for example at a resolution suitable for broadcast or streaming (such as 3840×2160 or 1920×1080 or 1280×720). However, at this stage of the process, the source video data holding entity 304 makes only the low-resolution source data available to the source hub 102. The low-resolution version of the video material may have an image resolution that is sub-broadcast level, for example 236×144, or 640×480, etc). In this way, the low-resolution video material may be seen as a low quality proxy version of the high-resolution video material. The source video data holding entity 304 may itself be configured to generate the low-resolution video material (for example, using any suitable down-conversion technique), or the generation of the low-resolution video material may be performed by some other entity. The source hub 102 may obtain the low-resolution source video data by transmitting a request to the source video data holding entity 304 and receiving the low-resolution source video data in response, or the source video data holding entity 304 may simply make the low-resolution source video data available for download from a data store by the source hub 102.

Optionally, the low-resolution source video data may comprise not only the low-resolution frames of video material, but also data defining a segment size used by the distributor in which video material is divided prior to distribution. The segment size may be defined in either time period or number of frames. In one example, the low resolution source video data comprises information on a minimum permitted length of insertion zone. If the insertion zone is below the minimum permitted length, then additional visual objects will not be embedded within the video material.

In step 320, the source hub 302 analyses the low-resolution video material to identify one or more "insertion zones" that correspond to one or more regions within the image contents of the video material that are suitable for insertion one or more additional visual objects.

In one example, following an identification of an insertion zone in a shot of the low-resolution video material, the remainder of the low resolution video material is analysed to identify if the insertion zone appears in one or more other shots in the low-resolution video material. Frames in which the insertion zones are identified are known as selected frames.

In step 330, the source hub 102 communicates a request to the video data holding entity 304 for a high-resolution version of the selected frames of the video material. The request may comprise any suitable data to enable to the video data holding entity 304 to identify the frames being requested, for example a identifier of the first and last frames of a continuous set of selected frames (such as a time stamp identifiers, or frames numbers, etc).

In step 340, the video data holding entity 304 provides high-resolution source video data to the source hub 102, for example by transmitting it to the source hub 102 or by making it available for download by the source hub 102 from a data store. The high-resolution video data comprises a second plurality of frames of the video material that comprise at least the selected frames of the video material. The second plurality of frames have a second image resolution that is higher than the first image resolution (for example, the second image resolution may be 'high' resolution or broadcast resolution). The second plurality of frames are a smaller sub-set of the first plurality of frames (the second plurality of frames is smaller in number than the first plurality of frames), such that the source hub 102 obtains only a part (typically, a small part, or a minority) of the high-resolution video material. The source hub 102 does not obtain the entire high-resolution video material. In some examples, the second plurality of frames may consist of only the selected frames of the video material. In other examples, the second plurality of frames may consist of the selected frames and also some additional frames of the video material (for example, some additional 'padding' frames). This is explained in further detail later.

In step 350, the one or more additional visual objects are embedded into the selected frames of the high-resolution source video data. In one example, the embedding of one or more additional objects into the high-resolution video material is carried out at the source hub 302 itself. In other examples, the high-resolution source video data and the one or more additional visual objects are provided to one or more remote hubs, such as a creative hub, to perform this embedding. Providing a hub in a remote location allows resources to be more efficiently distributed, for example, by locating the remote hub near a larger pool of labour.

In step 360, output video data is created. The output video data comprises the selected frames of the high-resolution video material with the embedded one or more additional visual objects.

Optionally, in step 370, metadata may be created to provide information on the frames of the high-resolution source video material to be replaced by the output video data. The metadata may comprise timing information, including the timing of a boundary point(s) in the source video material indicative of the frames to be replaced. In one example, the metadata comprises timing information on the length of time of the output video data. In another example, the metadata includes information on the number of frames of output video data.

Optionally, in one example, the metadata includes data on a tracking pixel. The tracking pixel can be configured to transmit a message as a result of the output video data being played. The tracking pixel could be placed at the start of the output video data, or at any point throughout the course of the output video data. If more than one tracking pixel is included in the metadata, the tracking pixel may be configured to fire at the start, middle and end of the output video data, then data can be collected on the number of times the start, the middle and end of the output video data are played.

In step 380, the output video data (and optionally the metadata) is transmitted to the video data holding entity 304. The video data holding entity 304 can then complete the final video by replacing the appropriate frames of the high-resolution video material with the output video data, which is explained in more detail later.

As can be seen, the source video is only ever exposed to the source hub 102 in its entirety in a low-resolution, proxy format that is not suitable for broadcast. The low-resolution version is sufficient for the source hub 102 to perform its analysis of the source video material to identify insertion zones, but low enough quality to reduce piracy risks and reduce the chances of the video material being made available unofficially before any official release date. Only a part of the high-resolution version is ever exposed outside of the video data holding entity 304 for video object insertion purposes. By only releasing a part of the high-resolution video material to the source hub 102, the source hub 102 is able to generate the output video data by carrying out the visual object insertion into video material that is suitable for broadcast and the video data holding entity 302 is able to complete the high-resolution final video itself. Not only does this process improve video content security, it also reduces the data transmission overhead between the video data holding entity 304 and the source hub 102, since transmitting the low-resolution source video material should require less bandwidth than transmitting the high-resolution source video material, and only a relatively small part of the high-resolution source video material is ever transmitted.

Optionally the low-resolution video material may comprise a watermark, such as a visible watermark or invisible watermark. This may even further improve video content security, particularly in the case of a visible watermark, as it may even further reduce the risk of piracy and/or early, unofficial release. The watermark may identify the content owner and/or the entity to whom the low-resolution video material has been made available, so that if there is any piracy and/or unofficial release, the source of the piracy and/or unofficial release may be more easily traced.

Furthermore, the high-resolution video material that is exposed to the source hub 102 may also comprise an invisible watermark, which may even further improve video content security in relation to the high-resolution video material.

Figure 4:
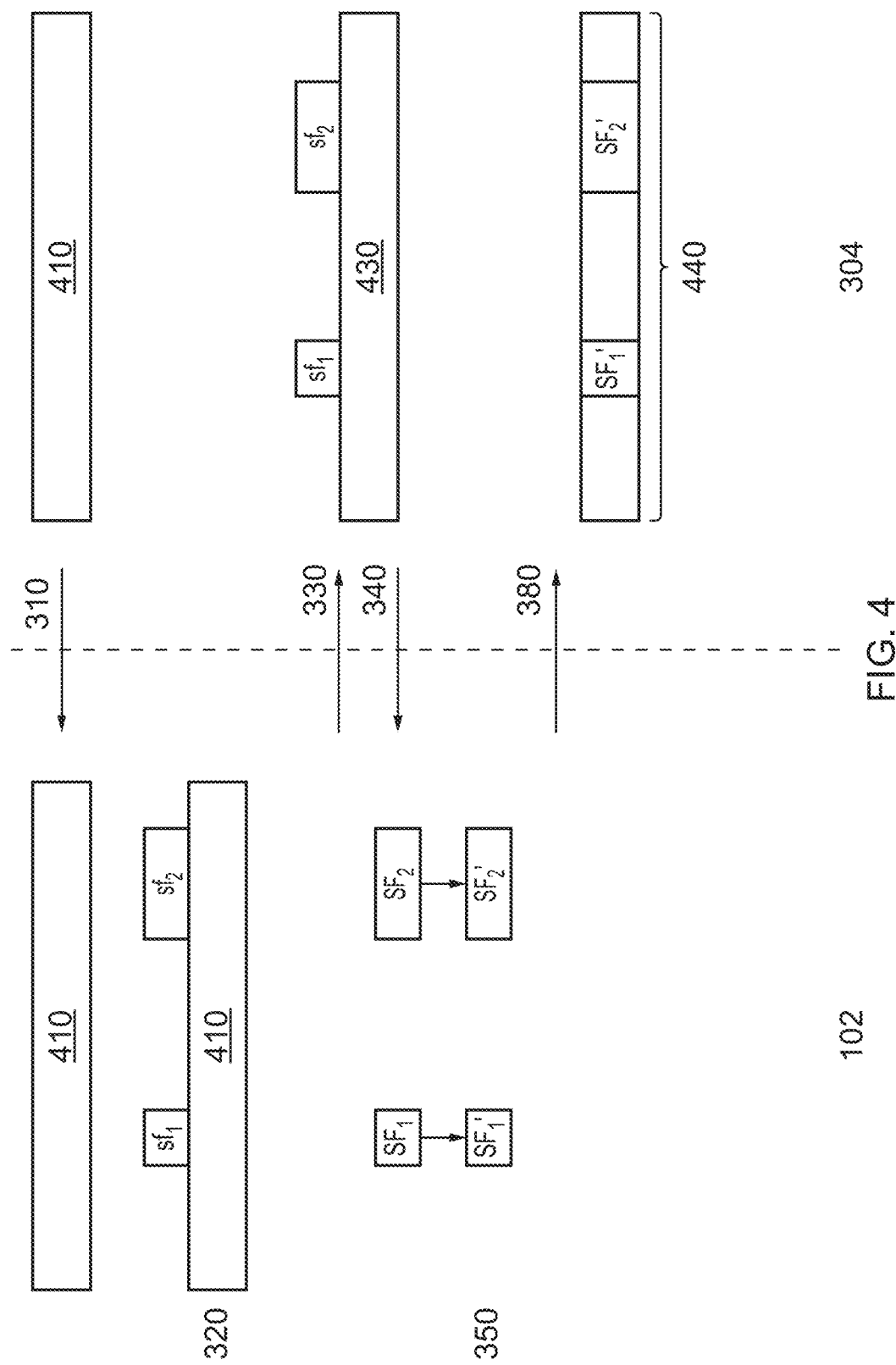
FIG. 4 shows a representation of a first example of generating output video data and inserting the output video data into high resolution source video material.

FIG. 4 shows a diagram representing a first example of the generation of output video data and insertion of the output video data into the high resolution source video material. In Step 310, the source hub 102 obtains the low resolution video data comprising the low-resolution video material 410, as described above.

In Step 320, selected frames $sf_1$ and $sf_2$ are identified, as described above.

In Step 330, the source hub 102 communicates a request to the video data holding entity 304 for a high-resolution version of the selected frames $sf_1$ and $sf_2$ of the video material, as described above. FIG. 4 shows that the video data holding entity 304 has the high resolution version of the video material 430 and shows a representation of the correspondence between the selected frames $sf_1$ and $sf_2$ and the high resolution version of the source video.

In Step 340, the video data holding entity 304 provides high-resolution source video data to the source hub 102, comprising a high resolution version of the selected frames $SF_1$ and $SF_2$.

In Step S350, the one or more additional video objects are embedded into the selected frames of the high-resolution source video. The high-resolution source video with the embedded one or more additional video objects is represented in FIG. 4 with reference numerals $SF_1'$ and $SF_2'$.

In Step 380, the output video data is transmitted to the video data holding entity 304, as described above. Steps 360 and 370 are not represented in FIG. 4 for the sake of clarity. The output video data may comprise metadata identifying the frames of the source video material to be replaced by the output video data. For example, the metadata may comprise timing information, including the timing of the boundary point(s) in the source video data indicative of the frames to be replaced. In one example, the metadata comprises timing information on the length of time of the output video data. In another example, the metadata includes information on the number of frames of output video data. Having received the output video data, the video data holding entity 304 may create final video 440. The final video 440 is the same as the high-resolution video material 430, except that the selected frames with embedded additional video objects SF1' and SF2' replace the corresponding frames of the high-resolution video material 430. Consequently, the final video 440 will have the same appearance as the high-resolution video material, except that the additional video object(s) will appear within the image content of the selected frames.

Figure 5:
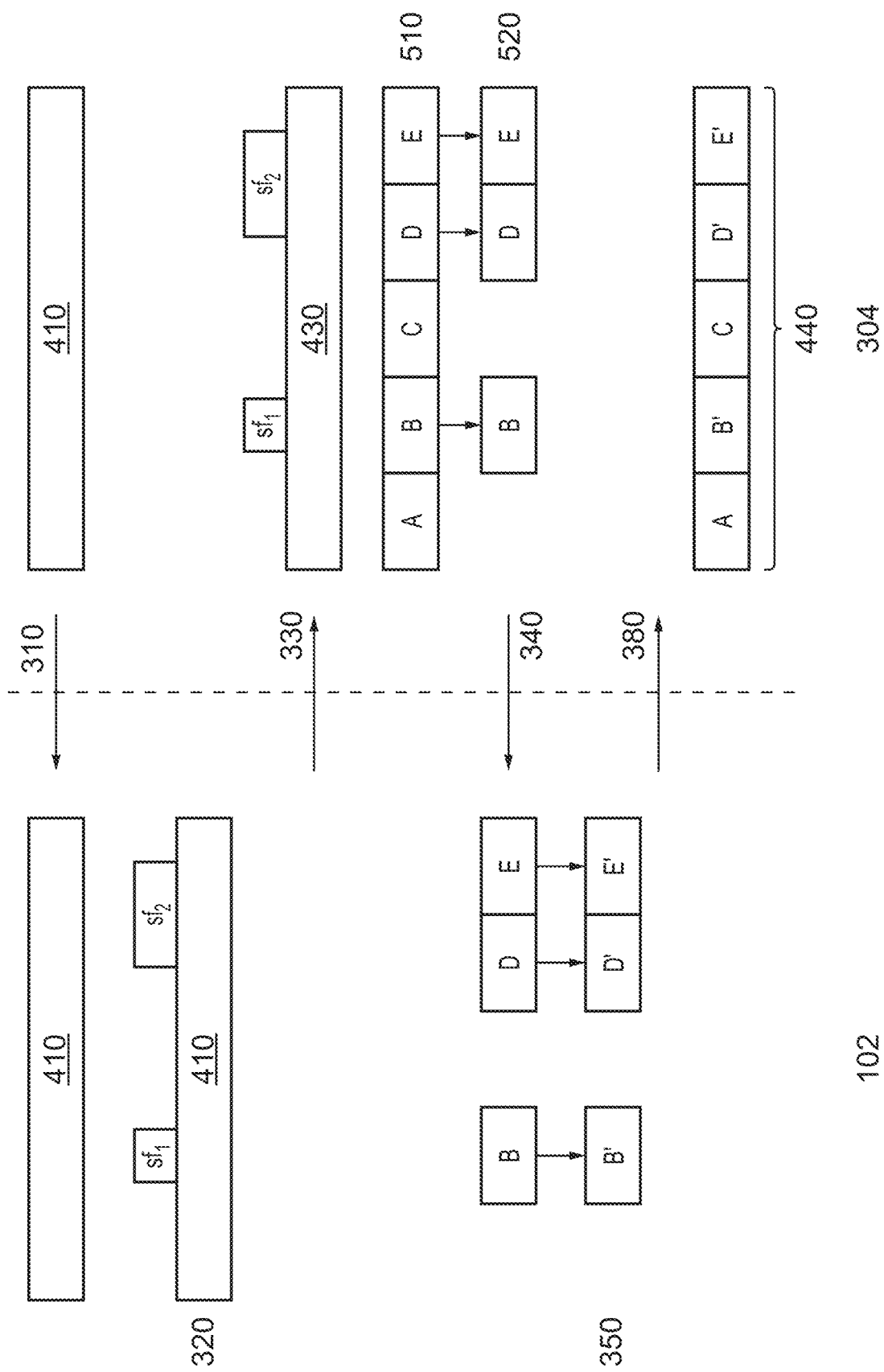
FIG. 5 shows a representation of a second example of generating output video data and inserting the output video data into high resolution source video material.

FIG. 5 shows a diagram representing a second example of the generation of output video data and insertion of the output video data into the high resolution source video material. In this example, the high-resolution video data obtained by the source hub 102 includes one or more 'padding' frames of high-resolution video material, in addition to the selected frames. This process of using padding frames may bring a number of benefits and was first disclosed in European patent number EP 3076681 A1, which is incorporated herein in its entirety by reference, and in particular FIGS. 5 to 7 and paragraphs 54 to 57 and 70 to 80.

Steps 310, 320 and 330 are the same as described above.

At step 510, after receiving the request for a high-resolution version of the selected frames $sf_1$ and $sf_2$, the video data holding entity 304 identifies segments within the high resolution video material 430, based on the segment size that will be used for distribution. The segments represent how the video material will be divided prior to distribution, based on data of the segment size provided by the distributor. The video material is not necessarily divided at this stage. The segments are represented in FIG. 5 with reference numerals A-E.

In step 520, the video data holding entity 304 calculates a location of at least one boundary point, based on the data defining the segment size into which video material is divided prior to distribution, and based on the selected frames $sf_1$ and $sf_2$. Each boundary point represents a start point of the earliest segment in which selected frames fall. In this particular example, selected frames $sf_1$ fall entirely within segment B, therefore the boundary point for selected frames $sf_1$ occurs at the boundary between segments A and B. For example, if the selected frames $sf_1$ occur between 2.5 s and 3.5 s from the start of the source video material, and the distributor provides information that the segment size is 2 s, then the video data holding entity 304 calculates that the boundary point will, in this example, occur at 2 s. The segment B includes the selected frames $sf_1$, and also includes one or more 'padding' frames between 2 s and 2.5 s and between 3.5 and 4 s, that do not have an identified insertion zone.

In this particular example, selected frames $sf_2$ fall within segments D and E, therefore the boundary point for selected frames $sf_2$ occurs at the boundary between segments C and D. For example, if selected frames $sf_2$ occur between 7 s and 9 s, and the segment size is 2 s, then again, the boundary point will occur at 6 s. The segments D and E include the selected frames $sf_2$, and also includes one or more 'padding' frames between 6 s and 7 s and between 9 s and 10 s that do not have an identified insertion zone.

In one example, two boundary points may be identified for each relevant segment of source video material, the first corresponds to the first frame of the segment and comprises an IDR frame, the second boundary point corresponds to the last frame of the segment, which is located one frame prior to the next IDR frame.

In step 340, the high resolution source video data is obtained by the source hub 102 as described above. However, in this example, the second plurality of frames in the high resolution source video data consists of the frames corresponding to segments B, D and E in the high resolution source video material. Therefore, the second plurality of frames comprises the selected frames and also some padding frames at the start and/or end of the selected frames so that whole segments of high resolution video are included in the high resolution source video data.

In Step S350, the one or more additional video objects are embedded into the selected frames of the high-resolution source video data, as described above. The high-resolution source video data with the embedded one or more additional video objects is represented in FIG. 4 with reference numerals A', D' and E'.

In Step 380, the output video data comprising modified segments A', D' and E' is transmitted to the video data holding entity 304, as described above. As can be seen, the final video 440 may then be created by replacing segments of the high resolution video material 430 with the video object inserted segments as necessary (in this example, segments B, D and E are replaced with video object inserted segments B', D' and E').

It can be seen that by using padding frames in this way, the creation of the final video 440 may be simplified, since it requires only the replacement of entire segments of the high resolution video material at the time of distribution, whilst still realising the benefits of never exposing the entire high-resolution source video outside of the video data holding entity 304.

Figure 6:
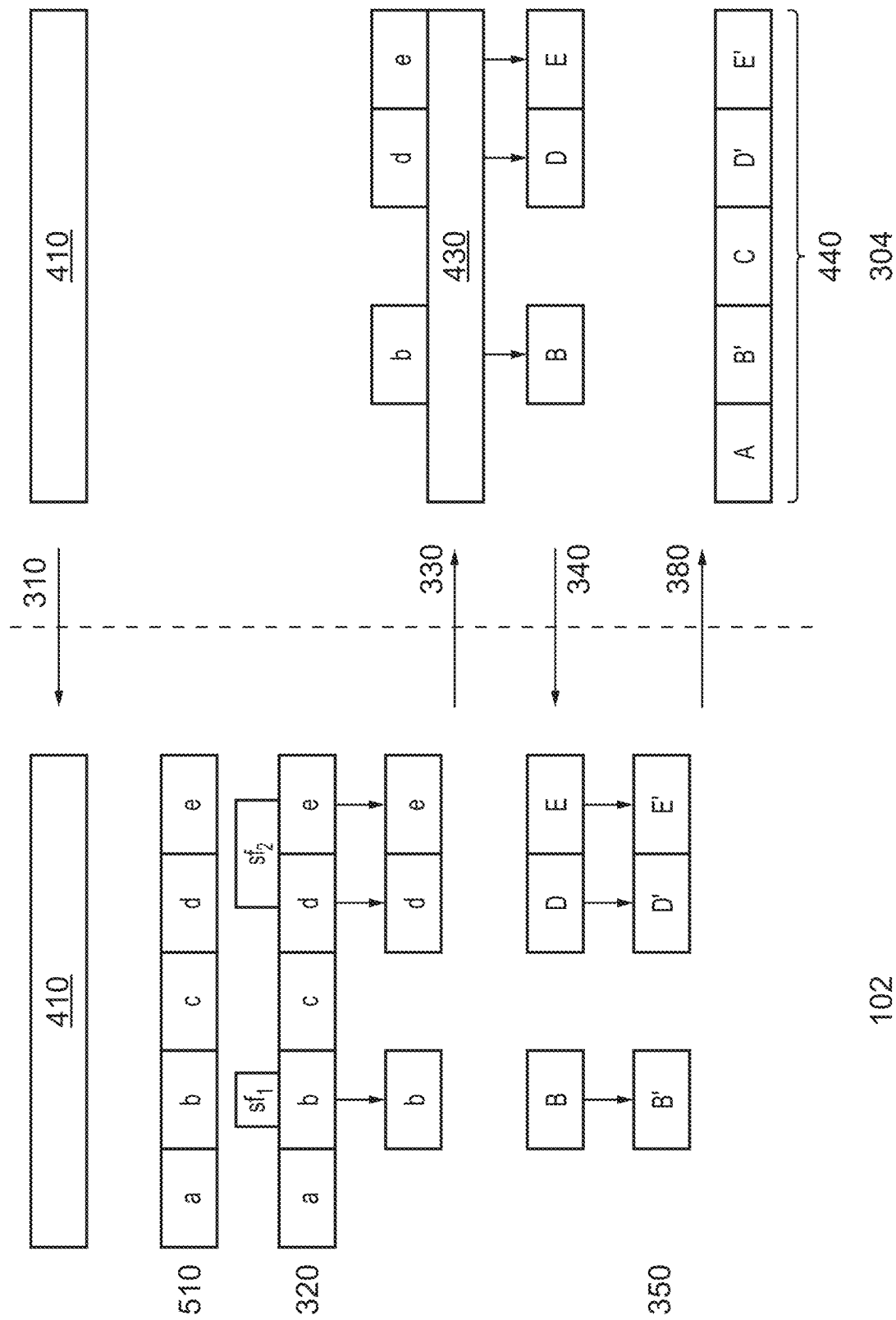
FIG. 6 shows a representation of a third example of generating output video data and inserting the output video data into high resolution source video material.

FIG. 6 shows a diagram representing a third example of the generation of output video data and insertion of the output video data into the high resolution source video material. This example is very similar to the example of FIG. 5, except that the source hub 102 performs steps 510 and 520 instead of the video data holding entity 304. In this example, the low-resolution source video data may further comprise data defining the segment size used by the distributor, so that the source hub 102 can carry out Steps 510 and 520. In Step 330, the source hub 102 communicates a request to the video data holding entity 304 for a high-resolution version of the identified segments B, D and E that each include at least some of the selected frames. The segments identified by the source hub 102 are labelled with lower-case a to e to identify them as segments of the low-resolution version of the source video material. The corresponding segments of the high-resolution version of the source video material are represented with capitals A to E.

FIG. 7 shows, by way of example only, a visualisation of a visual object embedded into the image content of a video. FIG. 7 shows an example still image 710 from a scene of a video. FIG. 7 also shows a still image 720 that is the same as image 710, but with a visual object 725 embedded into the image content of the scene. As can be seen, the visual object 125 is inserted to appear as though it is part of the scene, such that a viewer may not realise that the visual object 725 has been digitally embedded into the scene after the scene was filmed. Instead, the visual object 725 may appear as though it were part of the scene when the scene was originally filmed.

The processes described above may be implemented by software, hardware or a combination of software and hardware. For example, the source hub 102 may be implemented by software comprising computer readable code, which when executed on one or more processors of a computing device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way.

The skilled person will readily appreciate that various alterations or modifications may be made to the above described aspects of the disclosure without departing from the scope of the disclosure.

For example, the output video data generated by the source hub 102 may be transmitted to an entity other than the source video holding entity 304. For example, the source hub 102 may obtain the low-resolution and high-resolution source video data from the content producer, but transmit the output video data to a distributor rather than the content producer. The distributor may then independently obtain the high-resolution video material from the content producer and create the final video at the time of distribution.

Whilst the source hub 102 is described above as being a part of a larger video processing system 100, it will be appreciated that the source hub 102 and its functionality may itself be seen as a system comprising one or more processors and memory for storing data as necessary. Other sub-modules represented in FIG. 1 may be components of one or more other systems that the source hub 102 may interface with as necessary.

In the above described process, the source hub 102 receives and analyses the low-resolution source video data (steps 310 and 320) and also receives the requested high-resolution frames. The source hub 102 either then itself embeds one or more additional visual objects and creates the output video data (steps 350 and 360), or forwards the high-resolution frames to a different entity to perform the embed and output video data creation steps. In an alternative, a first entity (such as the source hub 102) may receive the low-resolution source video data, analyse it and indicate to the source video holding entity 304 the relevant high-resolution frames (steps 310, 320, 330). A completely separate entity (such as a graphics embed entity), potentially located in a different geographic location to the first entity, may then receive the high-resolution frames (step 340) and perform steps 350 and 360. It may then send the output video data to the source video holding entity 304 and/or some other suitable entity, such as a distributer. In this example, the first entity that performed steps 320 and 330 would not itself receive the high resolution frames from the source video holding entity 304.

The invention claimed is:

1. Apparatus comprising non-volatile machine-readable storage medium storing a program having instructions which when executed by one or more processors cause the one or more processors to incorporate one or more visual objects into frames of source video material, wherein the source video material comprises a plurality of frames, the instructions causing the one or more processors to:

obtain low-resolution source video data comprising a first plurality of frames of video material, wherein the first plurality of frames are a version of the frames of the source video material having a lower resolution than the source video material;

analyze the low-resolution source video data to identify selected frames of the source video material;

identify one or more insertion zones within the low-resolution source video data, wherein the insertion zones correspond to one or more regions within the image contents of the selected frames of the source video material that are suitable for the insertion of one or more visual objects;

obtain high-resolution source video data comprising a second plurality of frames of the video material, wherein the second plurality of frames comprise a version of the selected frames of the source video material having a resolution higher than that of the low-resolution source video data;

embed the one or more visual objects into the high resolution source video data of the selected frames of the source video material; and create output video data that comprises the high resolution source video data incorporating the embedded one or more visual objects in the insertion zones identified in the low-resolution source video data, wherein the second plurality of frames comprise some, but not all, of the frames of the source video material.

2. The apparatus of claim 1, wherein the image resolution of the second plurality of frames is a broadcast image resolution.

3. The apparatus of claim 1, wherein the image resolution of first plurality of frames is a sub-broadcast image resolution.

4. The apparatus of claim 1, wherein the second plurality of frames consists of only the high-resolution version of the selected frames of the source video material.

5. The apparatus of claim 1, wherein the source video material is to be divided into one or more segments when transmitted by a distributor, and wherein a start of the second plurality of frames corresponds with a start of a segment into which the source video material is to be divided when transmitted by the distributor.

6. The apparatus of claim 1, wherein the instructions further cause the one or more processors to transmit the output video data to a distributor and/or content owner.

7. The computer implemented method of claim 6, further comprising another of the one or more processors, operated by a distributor and/or content owner to create a final video by replacing the relevant frames of a high-resolution version of the source video with the output video data.

8. The apparatus of claim 1 further comprising:
the processor;
a memory;
wherein the processor and the memory comprise circuits and software for performing the instructions on the storage medium.

9. A system for incorporating one or more visual objects into source video material, wherein the source video material comprises a plurality of frames, the system comprising:
memory configured to store low-resolution source video data comprising a first plurality of frames of video material, wherein the first plurality of frames are a version of the frames of the source video material having a lower resolution than the source video material; and
one or more processors configured to:
analyse the low-resolution source video data to identify selected frames of the source video material;
identify one or more insertion zones within the low-resolution source video data, wherein the insertion zones correspond to one or more regions within the image contents of the selected frames of the source video material that are suitable for the insertion of one or more visual objects;
obtain high-resolution source video data comprising a second plurality of frames of the video material, wherein the second plurality of frames comprise a version of the selected frames of the source video material having a resolution higher than that of the low-resolution source video data;
embed the one or more visual objects into the high resolution source video data of the selected frames of the source video material; and
create output video data that comprises the high resolution source video data incorporating the embedded one or more visual objects in the insertion zones identified in the low-resolution source video data,
wherein the second plurality of frames comprise some, but not all, of the frames of the source video material.

10. The system of claim 9, wherein the image resolution of the second plurality of frames is a broadcast image resolution.

11. The system of claim 9, wherein the image resolution of first plurality of frames is a sub-broadcast image resolution.

12. The system of claim 9, wherein the second plurality of frames consists of only the high-resolution version of the selected frames of the source video material.

13. The system of claim 9, wherein the source video material is to be divided into one or more segments when transmitted by a distributor, and wherein a start of the second plurality of frames corresponds with a start of a segment into which the source video material is to be divided when transmitted by the distributor.

14. A method for incorporating one or more visual objects into source video material, wherein the source video material comprises a plurality of frames, the method comprising:
obtaining low-resolution source video data comprising a first plurality of frames of video material, wherein the first plurality of frames are a version of the frames of the source video material having a lower resolution than the source video material;
analyzing the low-resolution source video data to identify selected frames of the source video material;
identifying one or more insertion zones within the low-resolution source video data, wherein the insertion zones correspond to one or more regions within the image contents of the selected frames of the source video material that are suitable for the insertion of one or more visual objects;
obtaining high-resolution source video data comprising a second plurality of frames of the video material, wherein the second plurality of frames comprise a version of the selected frames of the source video material having a resolution higher than that of the low-resolution source video data;
embedding the one or more visual objects into the high resolution source video data of the selected frames of the source video material; and
creating output video data that comprises the high resolution source video data incorporating the embedded one or more visual objects in the insertion zones identified in the low-resolution source video data,
wherein the second plurality of frames comprise some, but not all, of the frames of the source video material.

15. The method of claim 14, wherein the image resolution of the second plurality of frames is a broadcast image resolution.

16. The method of claim 14, wherein the image resolution of first plurality of frames is a sub-broadcast image resolution.

17. The method of claim 14, wherein the second plurality of frames consists of only the high-resolution version of the selected frames of the source video material.

18. The method of claim 14, wherein the source video material is to be divided into one or more segments when transmitted by a distributor, and wherein a start of the second plurality of frames corresponds with a start of a segment into which the source video material is to be divided when transmitted by the distributor.

19. The method of claim 14, further comprising transmitting the output video data to a distributor and/or content owner.

20. The method of claim 14, further comprising creating a final video by replacing the relevant frames of a high-resolution version of the source video with the output video data.

* * * * *